Patented June 7, 1932

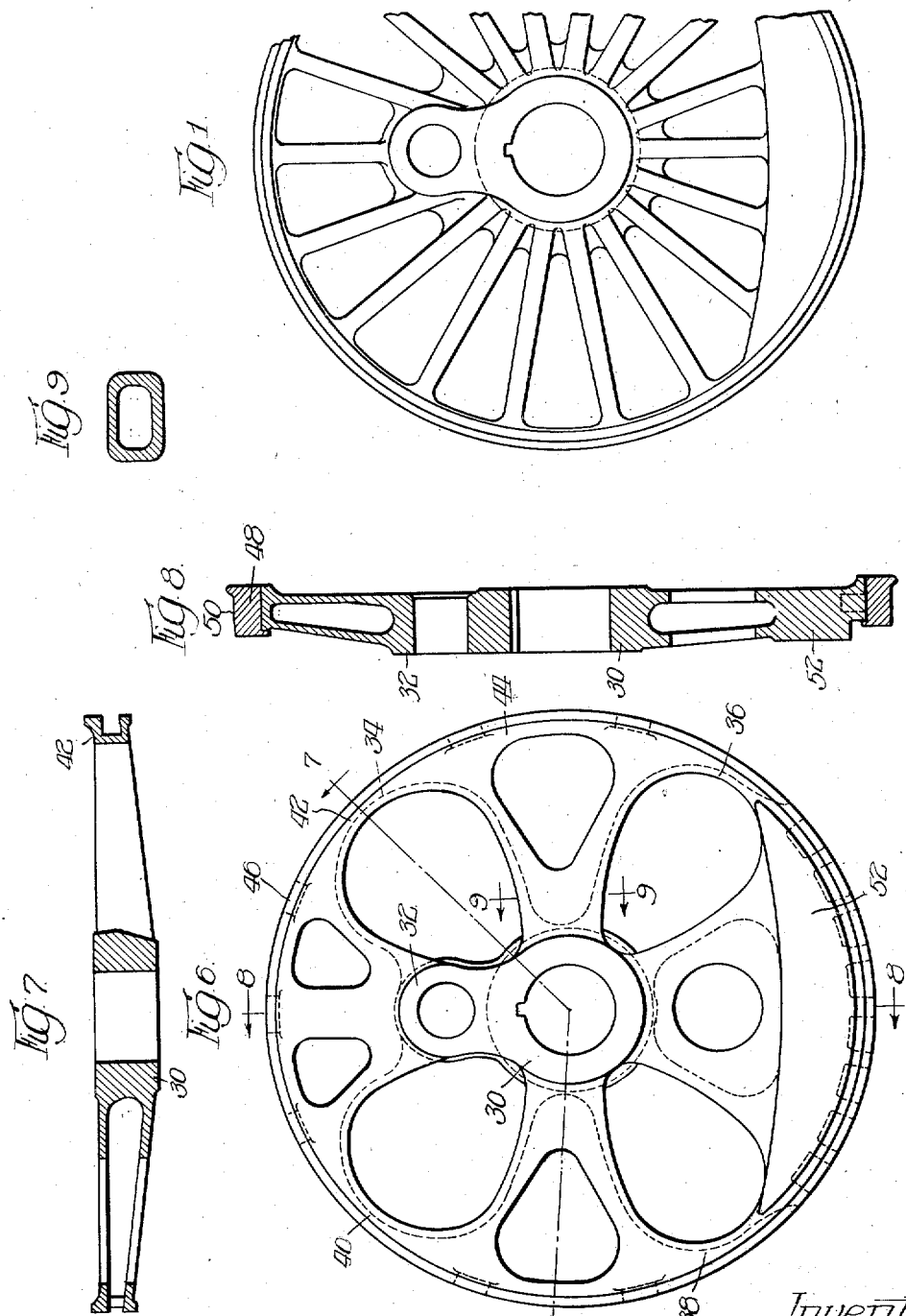

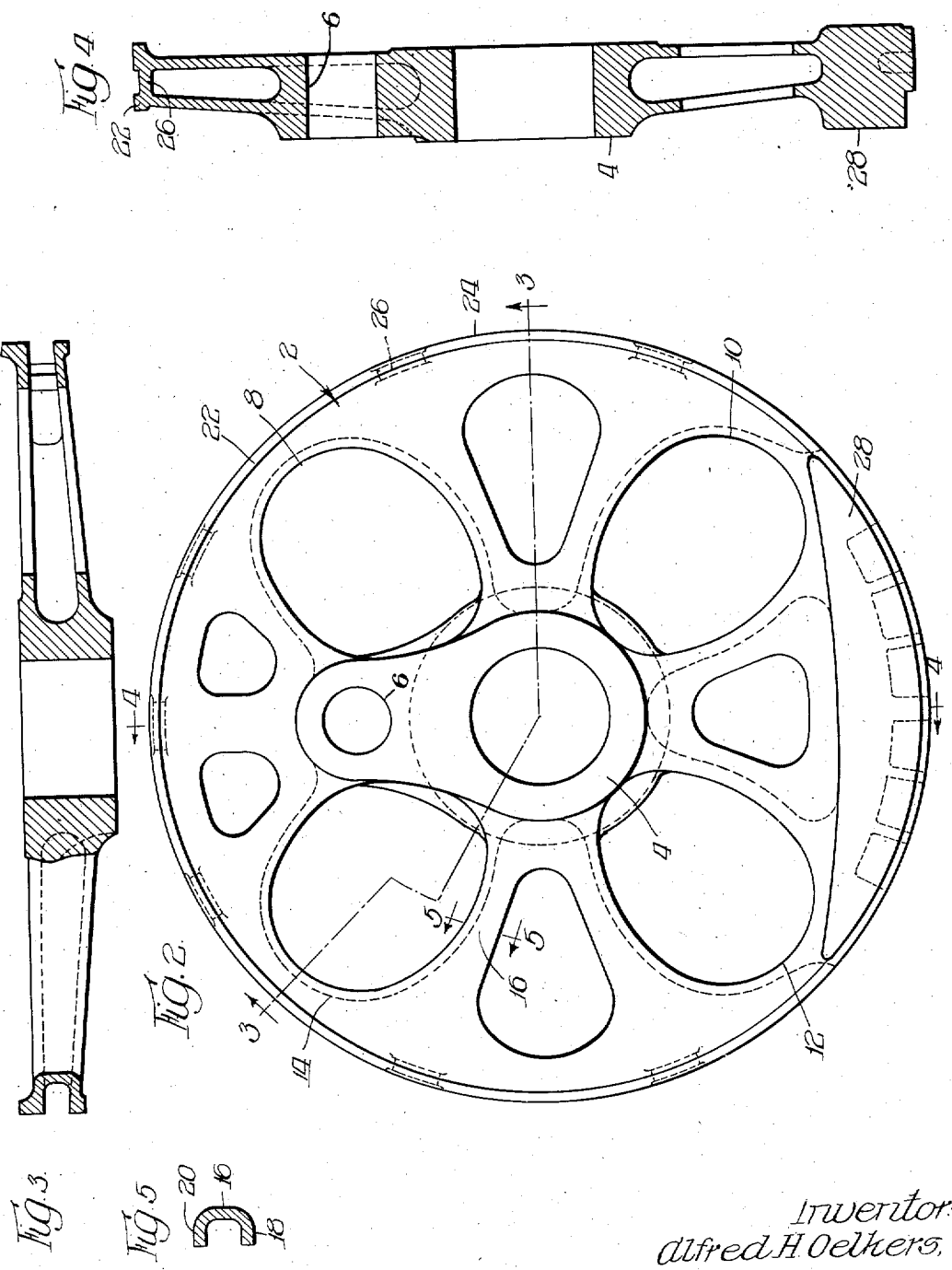

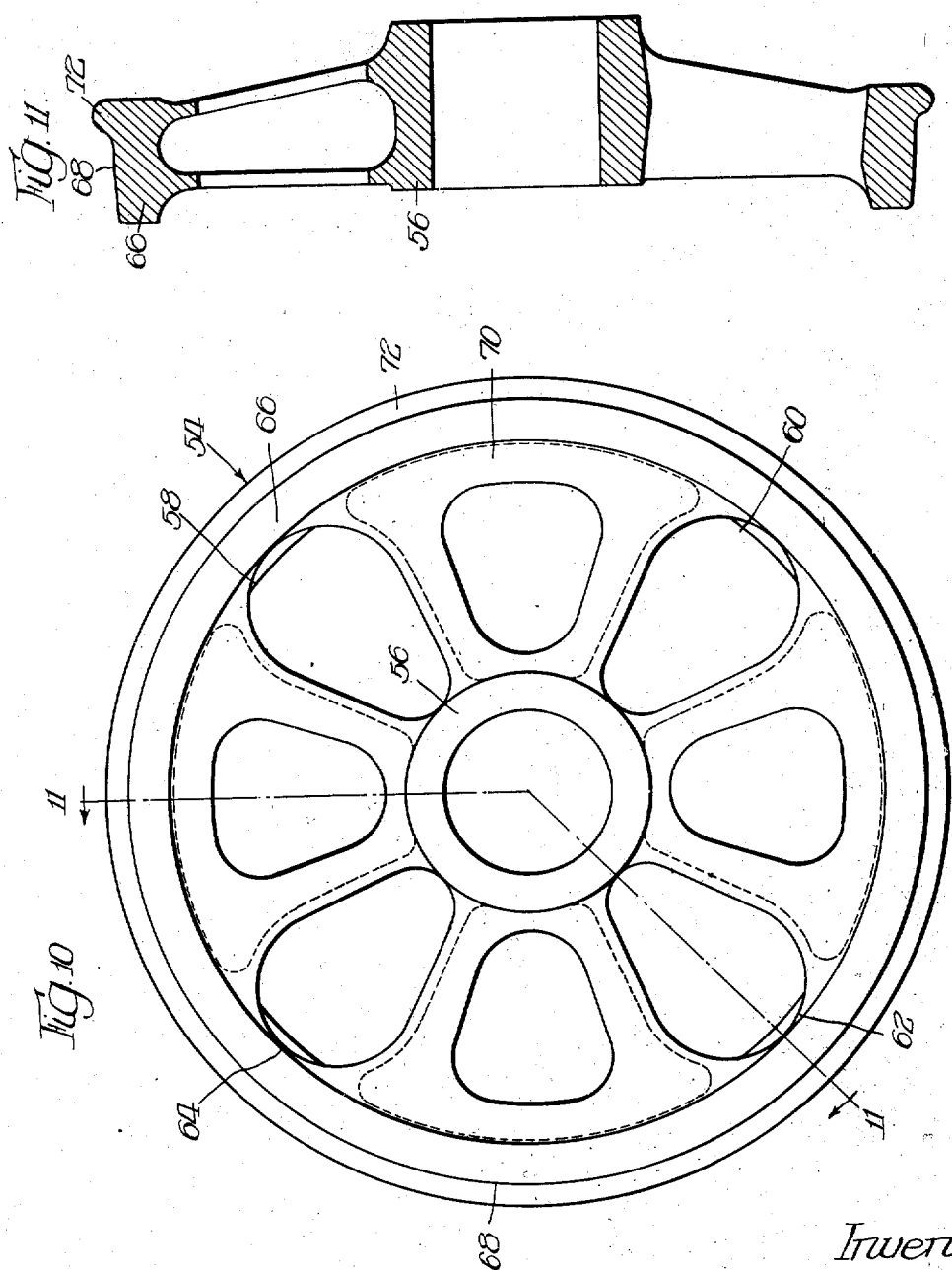

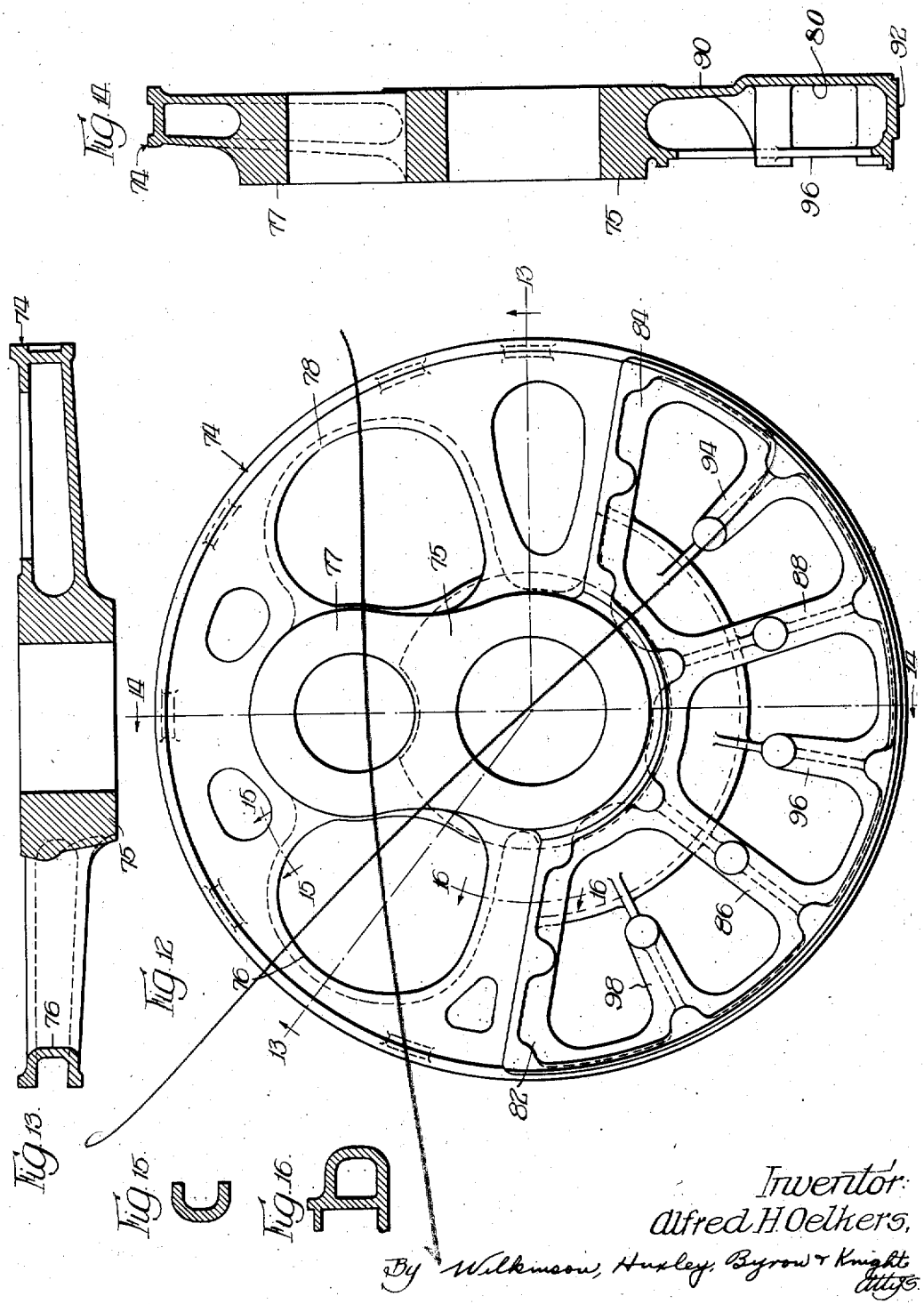

1,862,157

UNITED STATES PATENT OFFICE

ALFRED H. OELKERS, OF CHICAGO, ILLINOIS, ASSIGNOR TO AMERICAN STEEL FOUNDRIES, OF CHICAGO, ILLINOIS, A CORPORATION OF NEW JERSEY

WHEEL

Application filed July 16, 1931. Serial No. 551,099.

The present invention relates to wheel constructions and includes novel constructions for wheels in car wheel truck assemblies and also locomotive drive wheels.

Among the objects of the present invention is to provide a novel wheel construction having arched portions associated with the hub and rim of the wheel, such portions being so designed that the same are in uniform compression, thereby eliminating localized stresses, such as occur at a junction of a spoke and rim of the present known wheel constructions.

Another object of the invention is to provide a novel wheel construction in which arched portions under uniform compression are provided and which extend radially and outwardly from the wheel hub, each of these arched portions having a rim forming part for the wheel.

The invention further contemplates the idea of providing a novel wheel construction in which the arched portions thereof and which radiate outwardly from the wheel hub are formed with a gradually tapering thickness of metal which enables the casting of such a wheel free from localized stresses existing in the present well known spoke design.

A still further object of the invention is to provide a novel wheel construction in which the arched portions thereof radiating outwardly from the wheel hub are channel shaped in cross-section and have a rim forming part, the wheel having rim forming parts between the channel shaped arched portions and integral therewith.

The invention further contemplates the idea of using the arched type of construction in a wheel construction having a separate tire forming portion fitting the rim of the wheel, as well as in a wheel construction in which the rim and tire are formed integral, and whether or not either or both of these constructions are provided with a crank-pin hub and counter-balance.

A still further object of the present invention is to provide a novel locomotive drive wheel construction having a lead counter-balance pocket of such a design that either a right or left wheel may be made from the same pattern by merely shifting the cores adjacent the pocket and the remaining portions of the wheel.

Still another object of the present invention is to provide a novel locomotive drive wheel construction having a lead counter-balance pocket, the remaining portion of the wheel having arched portions of the type hereinbefore set out extending outwardly from the hub of the wheel and a crank pin hub made integral with the wheel hub.

The invention still further contemplates the idea of providing a lead counter-balance pocket in a locomotive drive wheel construction, either with or without the arched construction heretofore referred to, having or being formed with spokes extending radially and outwardly from the wheel hub integrally connected together with a transverse web having a rim forming part. In the embodiment selected to illustrate the invention, spokes are provided intermediate the other spokes, these spokes being integral with the web and rim forming part thereof and extending inwardly and radially therefrom and terminating in spaced relation with the wheel hub.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary view in side elevation of a car wheel disclosing the present well known spoke and rim type construction;

Figure 2 is a view in side elevation of an embodiment made in accordance with the present invention;

Figure 3 is a cross-sectional view taken in the planes represented by line 3—3 of Figure 2 of the drawings;

Figure 4 is a cross-sectional view taken in the plane represented by line 4—4 of Figure 2 of the drawings;

Figure 5 is a view in cross-section taken in the plane represented by line 5—5 of Figure 2 of the drawings and revolved through substantially ninety degrees;

Figure 6 is a view in side elevation of another embodiment disclosing the present invention;

Figure 7 is a view in cross-section taken in the planes represented by line 7—7 of Figure 6 of the drawings;

Figure 8 is a view in cross-section taken in the plane represented by line 8—8 of Figure 6 of the drawings;

Figure 9 is a view in cross-section taken in the plane represented by line 9—9 of Figure 6 of the drawings and revolved through substantially ninety degrees;

Figure 10 is still another embodiment disclosing the present invention;

Figure 11 is a view in cross-section taken in the planes represented by line 11—11 of Figure 10 of the drawings;

Figure 12 is a view in side elevation of still another embodiment disclosing the present invention;

Figure 13 is a view in cross-section taken in the planes represented by line 13—13 of Figure 12 of the drawings;

Figure 14 is a view in cross-section taken in a plane represented by line 14—14 of Figure 12 of the drawings;

Figure 15 is a view in cross-section taken in the plane represented by line 15—15 of Figure 12 of the drawings and revolved through substantially ninety degrees; and Figure 16 is a view in cross-section taken in a plane represented by line 16—16 of Figure 12 of the drawings and revolved through substantially ninety degrees.

Referring now more in detail to the drawings, an embodiment selected to illustrate the invention is disclosed in connection with a locomotive drive wheel or drive wheel center 2, having a wheel hub 4 and a crank-pin hub 6 formed integral therewith. Extending outwardly from the wheel hub 4 and crank pin hub 6 are arched portions 8, 10, 12 and 14, each of these arched portions being formed in the shape of a U, having a central web 16 and spaced side webs 18 and 20, as clearly shown in Figure 5 of the drawings.

Each of these arched portions extends outwardly and circumferentially and is provided with a rim forming part or portion 22 of a shape similar to the cross-sectional view shown in Figure 5 of the drawings. The side webs 18 and 20 of the arched portions between the same are integrally connected to form rim forming parts or portions 24, these parts or portions being connected and reinforced by transverse ties 26 at spaced intervals and integral therewith. Between the arched portions 10 and 12, the spoke forming webs 18 and 20 thereof, are provided with a counterbalance 28 directly opposite the crank pin hub 6. In this embodiment, this wheel or wheel center may be provided with a tire having a flange tread portion adapted to fit therearound.

In Figures 6 to 9 inclusive, of the drawings, the embodiment disclosed therein is of a similar construction, as that disclosed in Figure 2, the same being provided with a wheel hub 30 having a crank pin hub 32 integral therewith and having arched portions 34, 36, 38 and 40 extending outwardly therefrom, each of these arched portions having a rim forming part or portion 42 which is connected by rim forming side webs 44 similar to the webs 18 and 20 of Figure 5 of the drawings. The rim forming webs 44 are connected together by transverse ties 46 and the wheel or wheel center is adapted to have a tire 48 fitting therearound, this tire being provided with a flanged tread portion 50. The rim forming webs 44 intermediate the arched portions 36 and 38 are provided with a counterbalance 52 oppositely disposed in relation to the crank pin hub 32.

In Figures 10 and 11, the present invention is shown embodied in a car wheel 54 having a wheel hub 56 and arched portions 58, 60, 62 and 64 extending radially and outwardly therefrom and being provided with an integral rim and tire portion 66 provided with a flanged tread 68. The arched portions of this embodiment are of a similar construction in cross-section as that disclosed in Figure 5 of the drawings, the side flanges or webs 70 thereof extending between the arched portions and having an integral rim and tire forming part or portion 72 provided with the flanged tread 68.

In each of the above embodiments, the arched portions having an integral rim and/or rim and tire forming parts or portions are so designed that all parts of the arches are in uniform compression, thereby eliminating localized stresses, such as occur at the junction between the spoke and rim of a wheel construction, as shown in Figure 1 of the drawings. Furthermore, the arches are joined to the hubs of the wheel by a gradually tapering thickness of metal, thus enabling the making of a casting free from localized stresses, such as those that have heretofore existed in the present known wheels.

In Figures 12 to 16 inclusive, the present novel wheel construction is shown in a locomotive drive wheel 74 having arched portions 76 and 78 of a similar construction to the arched portions of the previous embodiments, and a lead counterbalance pocket 80. The arched portions 76 and 78 extend outwardly from a wheel hub 75 and a crank-pin hub 77 integral therewith, and are of a construction similar to the arched portions disclosed in the previously referred to embodiments.

This wheel is further provided with the lead counterbalance pocket 80 comprising radially extending webbed spokes 82 and 84 integral with the arched portions 76 and 78 and intermediate spokes 86 and 88 extending radially and outwardly from the hub 75. This lead counterbalance pocket is substantially opposite the crank-pin hub 77 and is provided with a transverse web 90 integral with the hub 75 and with the spokes 82, 84, 86 and 88. This transverse web 90 has a rim forming part 92 and spokes 94, 96 and 98 integral therewith and intermediate the other spokes, which extend radially and inwardly from the rim forming part 92 and terminating in spaced relation with the hub 75, these intermediate spokes effectively reinforcing the web 90 and rim forming part 92. As clearly shown in Figure 8 of the drawings, this particular embodiment of the invention may likewise be provided with a tire portion adapted to fit thereover and be secured thereto, to provide a finished locomotive drive wheel.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. A car wheel comprising a hub portion, a rim portion, and channel-shaped spokes extending therebetween.

2. A car wheel comprising a hub portion, channel-shaped spokes extending radially therefrom, and integral web portions forming a rim for said wheel.

3. A car wheel comprising a hub portion, spokes extending radially and outwardly therefrom, and channel-shaped webs extending between said spokes for providing a rim portion for said wheel.

4. A car wheel comprising a hub portion, channel-shaped spokes extending radially and outwardly therefrom, and channel-shaped webs extending between said spokes for providing a rim portion for said wheel.

5. A car wheel comprising a hub portion, spokes extending radially and outwardly therefrom, said spokes having channel-shaped portions, webs extending between said portions, and webs between said spoke portions, said webs forming a rim for said wheel.

6. A car wheel comprising a hub portion, spokes extending radially and outwardly therefrom, said spokes having channel-shaped web portions extending radially and circumferentially and having integral channel-shaped web portions forming rim portions for said wheel, and webs integral with said channel-shaped spoke portions forming other rim portions for said wheel.

7. A car wheel comprising a hub portion, spokes extending radially and outwardly therefrom, said spokes having web portions extending radially and circumferentially and having integral web portions forming rim portions for said wheel, web portions integral with said first mentioned web portions for forming other rim portions for said wheel, and ties connecting said last mentioned web portions.

8. A car wheel comprising a hub portion, spokes extending radially and outwardly therefrom, said spokes having channel-shaped web portions extending radially and circumferentially and having integral channel-shaped web portions forming rim portions for said wheel, webs integral with said channel-shaped spoke portions forming other rim portions for said wheel, and ties connecting the webs between said spoke portions.

9. A car wheel comprising a hub portion, spokes extending radially and outwardly therefrom, said spokes having channel-shaped portions, webs integral with said channel-shaped portions forming arched rim portions, and arched rim forming channel-shaped portions integral with the channel-shaped portions of said spokes.

10. A car wheel comprising a hub portion, spokes extending radially and outwardly therefrom, said spokes having channel-shaped portions, webs integral with said channel-shaped portions forming arch rim portions, tie members connecting said webs, and arched rim forming channel-shaped portions integral with the channel-shaped portions of said spokes.

11. A car wheel comprising a hub portion, spokes extending radially and outwardly therefrom, said spokes having channel-shaped portions, webs integral with said channel-shaped portions forming arched rim portions, arched rim forming channel shaped portions integral with the channel-shaped portions of said spokes and a tire provided with a flanged tread fitting said rim.

12. A car wheel comprising a hub portion, radially and outwardly extending channel-shaped arched portions having a rim forming part, and rim forming parts between said arched portions.

13. A car wheel comprising a hub portion, radially and outwardly extending channel-shaped arched portions having a rim forming part, rim forming parts between said arched portions, and a tire having a flanged tread fitting said rim.

14. A car wheel comprising a hub portion, radially and outwardly extending channel-shaped arched portions having a rim forming part, rim forming parts between said arched portions, a crank pin hub formed in one of said portions, and a counter-balance formed on another of said portions.

15. A car wheel comprising a hub portion, radially and outwardly extending channel-shaped arched portions having a rim forming part, rim forming parts between said arched portions, a crank pin hub formed in one of said portions, a counter-balance formed on another of said portions, and a tire provided with a flanged tread fitting said rim.

16. A car wheel comprising a hub portion, radially and outwardly extending arched portions having a rim and flanged tread forming part, and a rim and flanged tread forming part between said arched portions.

17. A car wheel comprising a hub portion, radially and outwardly extending channel-shaped arched portions having a rim and flanged tread forming part, and a rim and flanged tread forming part between said arched portions.

18. A car wheel comprising a hub portion, radially and outwardly extending channel-shaped arched portions having a rim and flanged tread forming part, and a channel-shaped rim and flanged tread forming part between said arched portions.

19. A locomotive drive wheel comprising a hub portion, a crank pin hub integral with said hub portion, said wheel being formed with arched portions and a lead counter-balance pocket, said arched portions extending outwardly from said hub portions and having rim forming parts, rim forming parts between said arched portions and between said arched portions and lead counter-pocket, said lead counterbalance pocket having spokes extending radially and outwardly from said wheel hub, transverse webs between said spokes and having a rim forming part, and spokes intermediate said first mentioned spokes extending radially and inwardly from said rim forming part of said webs and terminating in spaced relation with said wheel hub.

20. A locomotive drive wheel comprising a hub portion, a crank pin hub integral with said hub portion, said wheel being formed with channel-shaped arched portions and a lead counter-balance pocket, said arched portions extending outwardly from said hub portions and having channel-shaped rim forming parts, rim forming webs between said arched portions, and between said arched portions and lead counter-balance pocket, said lead counter-balance pocket having spokes extending radially and outwardly from said wheel hub, and transverse webs between said spokes and having a rim forming part.

21. A locomotive drive wheel comprising a hub portion, a crank pin hub integral with said hub portion, said wheel being formed with channel-shaped arched portions and a lead counter-balance pocket, said arched portions extending outwardly from said hub portions and having channel-shaped rim forming parts, rim forming webs between said arched portions and between said arched portions and lead counter-balance pocket, said lead counter-balance pocket having spokes extending radially and outwardly from said wheel hub, and a web integral with said spokes to provide said pocket and having a rim forming part.

22. A locomotive drive wheel comprising a hub portion, a crank pin hub integral with said hub portion, said wheel being formed with channel-shaped arched portions and a lead counter-balance pocket, said arched portions extending outwardly from said hub portions and having channel-shaped rim forming parts, rim forming webs between said arched portions and between said arched portions and lead counter-balance pocket, said lead counter-balance pocket having spokes extending radially and outwardly from said wheel hub, transverse webs between said spokes and having a rim forming part, and spokes intermediate said first mentioned spokes extending radially and inwardly from said rim forming part of said webs and terminating in spaced relation with said wheel hub.

Signed at Chicago, Illinois, this 8th day of July, 1931.

ALFRED H. OELKERS.